July 17, 1962     H. J. DE LONG     3,044,108
ROTARY DRUM TYPE CHICKEN PICKING MACHINE Filed Nov. 5, 1959     3 Sheets-Sheet 1

INVENTOR:
HORACE J. DELONG
BY:
ATTORNEY

July 17, 1962   H. J. DE LONG   3,044,108
ROTARY DRUM TYPE CHICKEN PICKING MACHINE
Filed Nov. 5, 1959   3 Sheets-Sheet 2

INVENTOR:
HORACE J. DELONG
BY:
ATTORNEY

July 17, 1962  H. J. DE LONG  3,044,108
ROTARY DRUM TYPE CHICKEN PICKING MACHINE
Filed Nov. 5, 1959  3 Sheets-Sheet 3
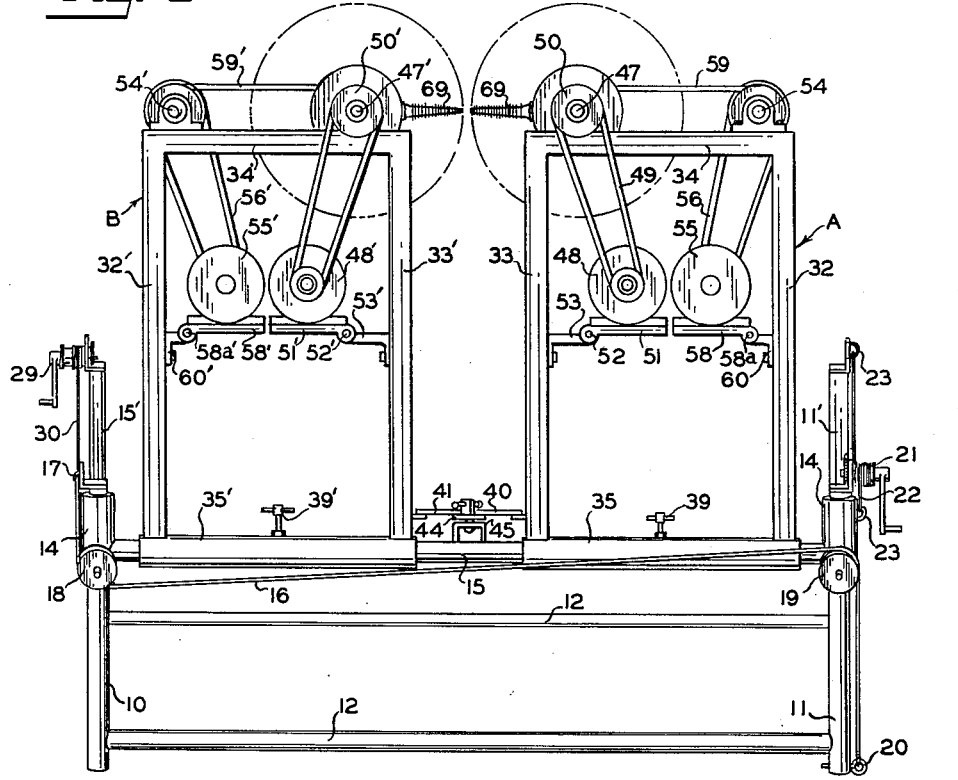
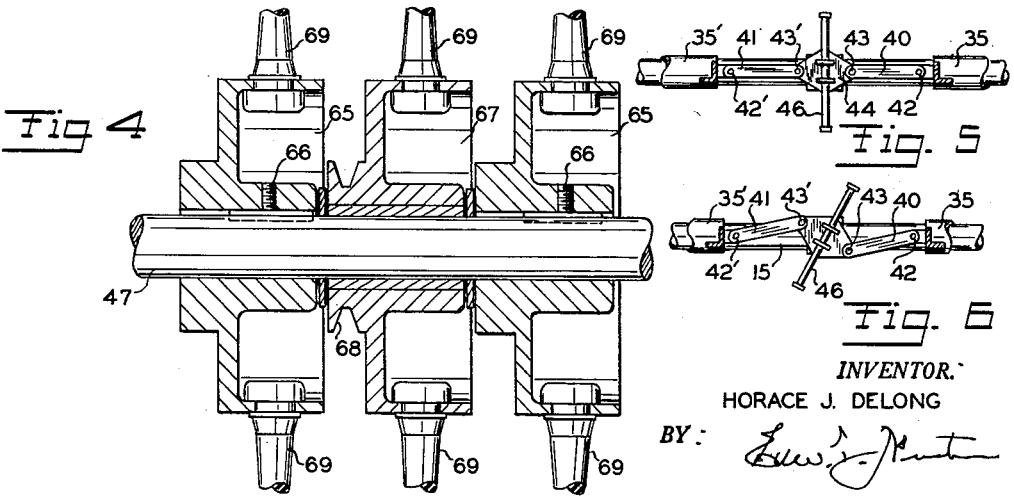
INVENTOR.
HORACE J. DELONG United States Patent Office 3,044,108
Patented July 17, 1962

3,044,108
ROTARY DRUM TYPE CHICKEN
PICKING MACHINE
Horace J. De Long, Gainesville, Ga., assignor to Gainesville Machine Co., Inc., Gainesville, Ga., a corporation of Georgia
Filed Nov. 5, 1959, Ser. No. 851,037
10 Claims. (Cl. 17—11.1)

This invention relates to a rotary drum type chicken picking machine.

In the prior art, machines for picking feathers off of chickens or other fowl have been constructed in which the chickens were conveyed between a pair of parallel rotary drums having a plurality of flexible rubber picking fingers extending from the periphery thereof so as to strike the chicken and snatch the feathers out. In the prior art, the fingers on the drum on one side of the picker moved in clockwise direction and the fingers on the drum on the other side of the picker moved in counterclockwise direction, and at least a pair, usually four, of such machines were used so as to have the fingers to sweep with a whiplash motion downwardly past the chicken in one machine and upwardly past the chicken in the other machine to get complete cleaning or removal of feathers.

According to the present invention, a single machine does the work of a plurality of prior art machines, because the flexible rubber fingers on each side of the machine are carried by a plurality of rotary drums driven in different directions. The same whiplash motion of the fingers is retained for effective removal of the feathers without scrubbing, but the necessity for a plurality of machines or for head holding means and reversal of the fowl in the shackles is eliminated, thus resulting in greater economy in the saving of initial investment in machinery, floor space and handling operations in the picking process.

For example, with a conveyor chain moving at the rate of 60 feet per minute, and with twenty-one drums on each side of my machine rotating at the rate of 500 r.p.m., with each drum carrying eight picking fingers, my machine is only 6 feet wide and 7 feet long, overall, thus requiring only 42 square feet of floor space and taking only 6 seconds for a fowl to pass through my machine and be completely picked.

An object of my invention, therefore, is the provision of a simple and compact machine for the effective removal of feathers from chickens and other fowl.

Another object of my invention is the provision of a rotary drum type chicken picking machine which is simple and effective in operation, rugged in construction, and well designed to meet the needs of economic manufacture.

Other objects, features and advantages of my machine will be obvious from the following specification taken in conjunction with the accompanying drawings wherein like characters of reference designate the same or corresponding parts throughout the several views, and in which:

FIG. 3 is a reduced scale end view taken in the direction of and in the plane of the arrows 3—3 in FIG. 1.

FIG. 4 is an enlarged fragmentary view in cross section showing details of the rotary drums.

FIG. 5 is a fragmentary view showing details of the width adjusting mechanism in the wide open position.

FIG. 6 is a fragmentary view similar to FIG. 5 showing details of the width adjusting mechanism in narrowed position.

Figure 1:
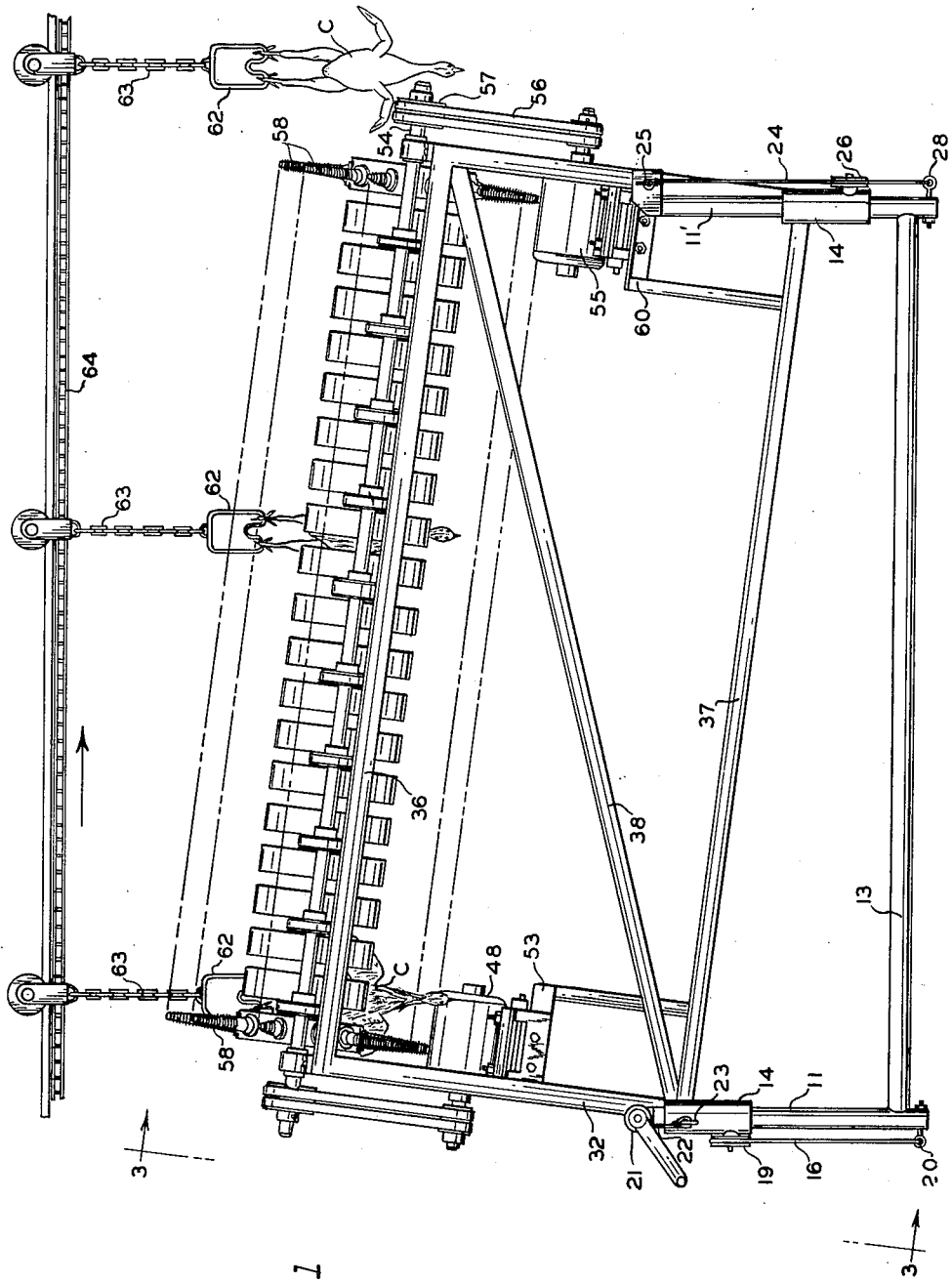
FIG. 1 is a side elevation of a rotary drum type chicken picking machine according to my invention.
Figure 2:
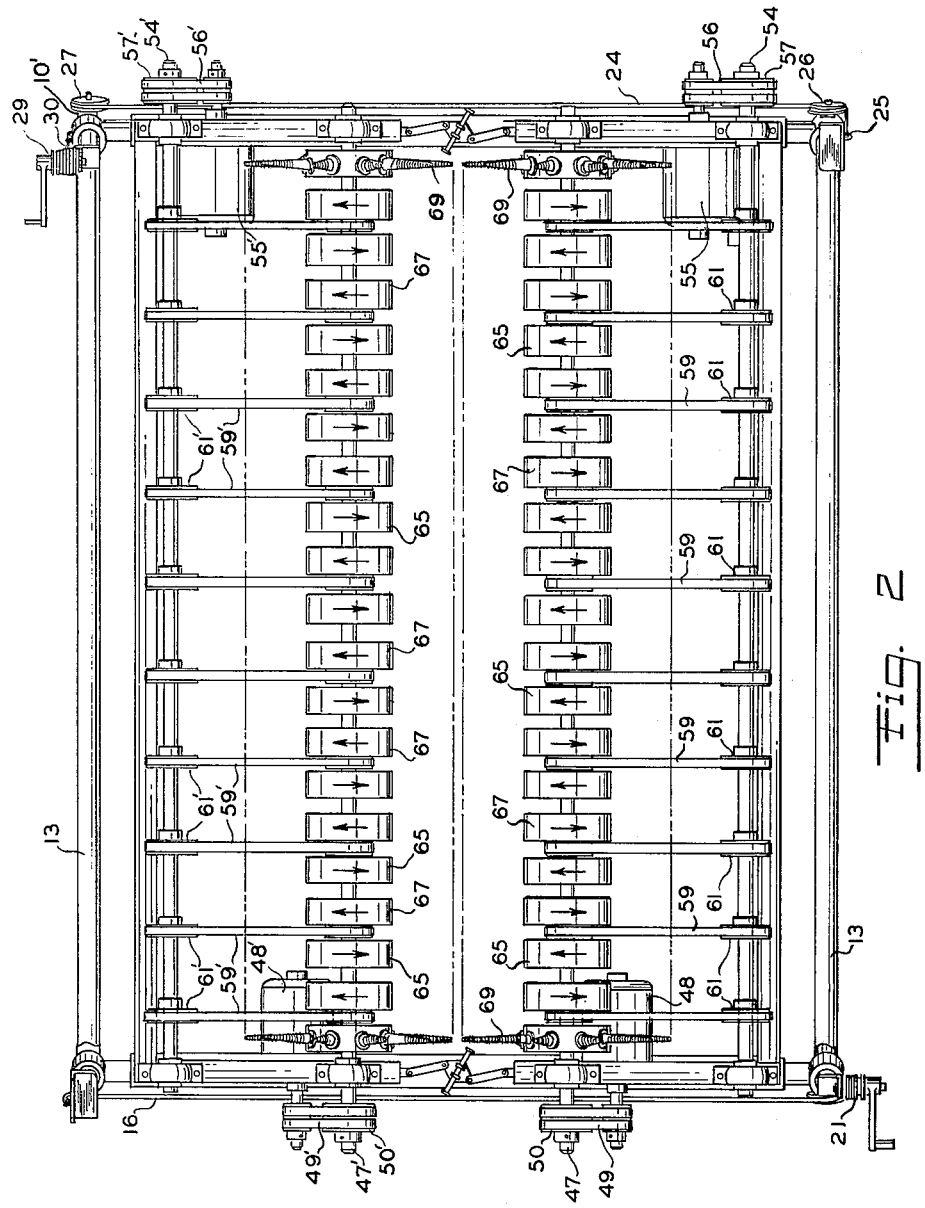
FIG. 2 is a top plan view of the machine shown in FIG. 1.

Referring now more in detail to the drawings, it will be seen that the machine is mounted upon a generally rectangular main frame denoted by numerals 10, 10', 11, 11' interconnected by cross frame members 12 and longitudinal frame members 13. On this main frame there is mounted a vertically adjustable carriage comprising a tubular collar 14 slidably mounted on each of the upright members 10, 10', 11, 11', the pairs of collars 14 on the upright members 10, 11, and 10', 11' at each end of the machine being connected together by a cross carriage tubular member 15.

In order to provide for the vertical adjustment of the above described carriage, a flexible cable 16 is attached at 17 to the upper end of tubular upright member 10 and passes downwardly around pulley 18 which is affixed to the slidable collar 14 mounted on the tubular upright 10, thence the flexible cable 16 passes transversely of the machine and over pulley 19 which is affixed to the slidable collar 14 on the tubular upright member 11 and thence downwardly to the bottom of tubular upright member 11 to which the cable 16 is there affixed as at the eye 20. On top of the tubular upright member 11 and windlass 21 is mounted, and this windlass carries a flexible cable 22 which is attached to the slidable collar 14 mounted on the tubular upright member 11, as at the eye 23. Similarly, at the opposite end of the machine, a cable 24 is attached to the top of tubular upright member 11' at the eye 25 and passes downwardly beneath a pulley 26 mounted on the slidable collar 14 on the tubular upright member 11' and thence across the machine and over a pulley 27 mounted on the slidable collar 14 on the tubular upright member 10' and thence downwardly to the bottom of the upright member 10' where it is attached at the eye 28. On top of the member 10', there is mounted a windlass 29 carrying a flexible cable 30 which is attached to the slidable collar 14 on the tubular upright member 10', all exactly in accordance with the details of the arrangement shown in FIG. 3 for the vertical adjustment apparatus, and details of the arrangement not apparent on the right hand end of the apparatus as shown in FIG. 1 are constructed the same and operated the same as the arrangement shown in FIG. 3 for similar apparatus on the left hand end of the machine as shown in FIG. 1. The operation of this apparatus for raising and lowering the ends of the machine individually will be hereinafter described in detail. Of course each windlass 21, 29 is provided with the customary prior art pawl and ratchet arrangement for holding the windlass in adjusted position.

A pair of picking frames, designated generally as A and B, are mounted on the vertically adjustable carriage. These picking frames are subtantially mirror copies of each other. When viewed from the end, as in FIG. 3, they are seen to be rectangular, comprising upright frame members 32, 33, connected at their top by cross frame member 34 and at the bottom by tubular cross frame member 35, the end opposite end shown in FIG. 3 being similarly constructed. The upright frame members, when viewed from the side, as seen in FIG. 1, are conneccted together at the top by main frame member 36 and at the bottom by longitudinal frame member 37 and are also connected by the angularly inclined brace member 38. The tubular members 35, 35' at each end of the picking frames are slidably mounted on a tubular member 15 for adjustment of the picking frames toward each other, the picking frames being held in adjusted position by means of set screw 39, and the adjustment of the picking frames toward each other being accomplished by sliding the tubular members 35 along the tubular member 15 by means of the mechanism shown most clearly in FIGS. 5 and 6. It will be observed that a pair of links 40, 41 are pivotally connected, respectively, at 42, 42' to the tubular members 35, 35' and the other end of each of these links is pivotally connected, respectively, at 43, 43' to the adjustment plate 44 which is rotatably mounted on a bracket 45 attached to the tubular member 15 for manual rotation of the adjustment plate to slidably adjust the tubular members 35, 35' on the tubular frame member 15, as shown in FIG. 6, for the purpose to be hereinafter more fully described.

The picking frame A mounts a main drive shaft 47 driven by a motor 48 through a belt 49 running over a pulley 50 on the main drive shaft 47. The motor 48 is mounted on a platform 51 which, in order to maintain proper belt tension, is pivotally mounted at 52 to an auxiliary frame 53 supported by the picker frame. Similar construction is found in picking frame B where the prime numerals are used.

Each picker frame also mounts an auxiliary drive shaft on counter-shaft 54 driven by a motor 55 through belt 56 running over pulley 57 on the counter-shaft, the motor 55 being carried by a platform 58 which is pivotally mounted at 58a to an auxiliary frame 60 supported by the picker frame.

Each main drive shaft 47 mounts a plurality of circular drums, the drums numbered 65 being fixed to the main drive shaft 47 by means of set screws 66 and keys, and certain other of the drums, numbered 67, being free to rotate upon the main drive shaft 47 and being provided with a pulley 68 formed integrally with the drums 67. All of the drums 65 and 67 are provided with the prior art resilient rubber picker fingers 69. The drums 65, being fixed to the main drive shaft 47, rotate therewith; and the drums 67, being free to rotate with respect to the main drive shaft 47, are driven from the counter-shaft 54 by means of belts 59 running over pulleys 61 on the counter-shaft and in the groove in the pulley 68 on each of the drums 67. The term "drums" as herein used is intended to be generic to rotatable support means for the fingers.

Each chicken C to be picked is suspended by its feet from a shackle 62 on a chain 63 carried by a conveyor 64, as is well known in the prior art.

*Operation*

In the operation of my picking machine, the elevation of each end of the adjustable carriage is independently adjusted so that the main drive shafts carrying the rotating drums mounting the flexible rubber picking fingers are inclined, as shown in FIG. 1. This is accomplished by means of the windlasses 21, 29 which can be turned to wind or unwind the cables attached thereto, winding of a cable onto a windlass serving to pull up on the slidable collar attached thereto so as to lift the collar and thereby raise that end of the vertically adjustable carriage, the cross connecting cable, such as 16, and the pulleys 18 and 19, serving to distribute the lifting moment over both sides of the machine so as to make the slidable collar 14 on each side follow in a level arrangement. In this manner the overall elevation of the picking frames can be adjusted, as well as the angular inclination of the main drive shafts carrying the drums mounting the picking fingers, and it will be observed from FIG. 1 that the inclination of the main drive shafts is so adjusted that the end of the machine which is first approached by the fowls to be cleaned, the left hand end shown in FIG. 1, is higher than the discharge end, the right hand end shown in FIG. 1, and the height of the upper approach end is such in that the picking fingers first strike the fowl to be picked upon the legs, and then as the fowl progresses through the machine toward the discharge end, from left to right in FIG. 1, the flexible picking fingers strike the fowl at progressively lower points on the body down to and including the heat and neck. Another adjustment on my machine is to govern the separation between the rotating drums on each picker frame so that the flexible rubber picker fingers 58 extend from opposite sides the proper distance to strike the fowl with a whiplash motion to remove the feathers without causing a scrubbing action which would break or bruise the skin of the fowl.

The next adjustment which may be made on my machine is the direction of rotation of the several drums on each of the main drive shafts, as well as the speed of rotation of those drums. It will be observed that each of the circular drums carrying the flexible rubber picker fingers is individually formed. Also, it will be noted that the drums 65, which are driven from the main drive shaft to which they are affixed, are interspersed with drums 67 which are driven from the counter-shaft 54; but, on opposite sides of the machine a drum 65 faces another drum 65, and a drum 67 faces an opposite drum 67 for the reason that it is desired to have drums facing each other on the opposite sides of the machine rotating in opposite directions, that is, when the drum on one side of the machine is rotating clockwise, the facing drum on the opposite side of the machine will be rotating counterclockwise. It must be especially noted that according to the drive arrangement shown in my machine the counter-shaft on each side of the machine drives the drums to which it is connected on that side of the machine in the opposite direction from the rotation of the drums on that side of the machine which are driven by the main drive shaft.

This drive arrangement is clearly indicated by the direction arrows on the drawings. Also it will be noted that the first drum carrying the picker fingers which first strike the fowl rotate in such a direction that the force applied from both sides of the machine tends to pull the feathers downwardly. Thereafter, the oppositely facing sets of drums alternate in their direction of rotation, and there is a real purpose in this arrangement in order to hold the fowl down between the sets of rotating fingers without the use of a head holding device, no head holding device being required in the machine according to my invention.

The prior art flexible rubber picking fingers which were especially designed for use with the rotating drum type picking machine are employed in my machine where the same whiplash action of the flexible fingers on the rotating drum is maintained; but, because the flexible pickers on the alternate sets of facing drums strike the feathers in opposite directions at the same time, the fowl is held in position for picking and the feathers are flicked from the fowl without a scrubbing action which would break or bruise the skin of the fowl.

With reference to the adjustment of the speed of rotation of the individual drums carrying the picking fingers, it will be noted that the speed of the drums driven from the counter-shafts may be adjusted by changing the size of the pulley on the counter-shaft, and here the speed of each individual drum driven from the counter-shaft is independently adjustable because the pulleys for driving the other drums are independent and separate from the pulley driving each drum. Also, the speed of rotation of the drums driven from the main drive shaft may be adjusted in a group by changing the size of the driving pulleys or by adjusting the speed of the driving motor. Also, the speed of the conveyor 63 carrying the birds through my machine may be adjusted, or the speed of rotation of the drums carrying the picking fingers may be adjusted in groups or individually, as mentioned above, with particular reference to the drums driven from the counter-shaft.

Finally, it will be noted that the last set of facing drums on my machine are driven in the same direction as the first set of facing drums, so as to insure proper downward pull on the fowl at the discharge point to prevent the fowl being thrown out of the machine and damaged as it leaves the machine.

Having described my improved chicken picking machine, it will be obvious to those skilled in the art that many modifications and changes may be made in the single embodiment shown for purpose of illustration without departing from the scope of my invention as defined by the appended claims.

I claim:

1. In a poultry picking machine having a main frame, a carriage including end members vertically adjustable independently on said frame, a pair of picking frames slidably mounted on said members for adjustment of the distance between said picking frames, a plurality of axially aligned drums rotatably mounted on one of said frames, drive means operably connected for rotating certain of said drums in clockwise direction and the alternate drums in counterclockwise direction, the arrangement being such that the drums to be rotated in counterclockwise direction are interspersed with the drums to be rotated in clockwise direction, similarly aligned and oppositely driven drums on the other of said picking frames, resilient means on the drums on both of said picking frames for striking and picking feathers from fowl conveyed along a predetermined path between said picking frames.

2. In a poultry picking machine having a main frame, a carriage including members vertically adjustable on said frame, a pair of picking frames mounted on said members, means for adjusting the distance between said picking frames, a plurality of axially aligned drums rotatably mounted on one of said frames, drive means operably connected for rotating certain of said drums in clockwise direction and alternate drums in counterclockwise direction, the arrangement being such that the drums to be rotated in counterclockwise direction are interspersed with the drums to be rotated in clockwise direction, similarly aligned and oppositely driven drums on the other of said picking frames, resilient means on the drums on both of said picking frames for striking and picking feathers from fowl conveyed along a predetermined path between said picking frames.

3. In a poultry picking machine having a main frame, a carriage including end members vertically adjustable independently on said frame, a pair of picking frames mounted on said members, means for adjusting the distance between said picking frames, a plurality of axially aligned drums rotatably mounted on one of said frames, drive means operably connected for rotating certain of said drums in clockwise direction and the remainder of said drums in counterclockwise direction, the arrangement being such that the drums to be rotated in counterclockwise direction are interspersed with the drums to be rotated in clockwise direction, similarly aligned and oppositely driven drums on the other of said picking frames, resilient means on the drums on both of said picking frames for striking and picking feathers from fowl conveyed along a predetermined path between said picking frames.

4. In a poultry picking machine having a main frame, a carriage including end members vertically adjustable on said frame, a pair of picking frames slidably mounted on said members for adjustment of the distance between said picking frames, a plurality of axially aligned drums rotatably mounted on one of said frames, drive means operably connected for rotating certain of said drums in clockwise direction and the remainder of said drums in counterclockwise direction, the arrangement being such that the drums to be rotated in counterclockwise direction are interspersed with the drums to be rotated in clockwise direction, similarly aligned and oppositely driven drums on the other of said picking frames, resilient means on the drums on both of said picking frames for striking and picking feathers from fowl conveyed along a predetermined path between said picking frames.

5. In a poultry picking machine having a main frame, a carriage including end members vertically adjustable independently on said frame, a pair of picking frames slidably mounted on said members for adjustment of the distance between said picking frames, a plurality of axially aligned drums rotatably mounted on one of said frames, drive means operably connected for rotating certain of said drums in clockwise direction and the remainder of said drums in counterclockwise direction, the arrangement being such that the drums to be rotated in counterclockwise direction are interspersed with the drums to be rotated in clockwise direction, similarly aligned and oppositely driven drums on the other of said picking frames, resilient means on the drums on both of said picking frames for striking and picking feathers from fowl conveyed along a predetermined path between said picking frames.

6. In a poultry picking machine, a main frame, a pair of picking frames adjustably supported on said frame for vertical adjustment at each end and lateral movement for adjustment of the distance between said picking frames, a drive shaft on each of said picking frames, said drive shafts being normally inclined from the horizontal and juxtaposed in substantially parallel relation both horizontally and vertically with respect to each other, a first series of drums secured to each said drive shaft for rotation therewith, a second series of drums mounted on each said drive shaft for rotation independently thereof with drums of said second series mounted alternately with drums of said first series and with drums of the first series on one drive shaft facing drums of the first series on the other drive shaft and with drums of the second series on one drive shaft facing drums of the second series on the other drive shaft, means connected to said main drive shafts for driving the series of drums secured thereto in opposite directions, means respectively connected with the drums of each said second series of drums for driving the drums of each said second series of drums in a direction opposite the direction of rotation of the main drive shaft on which they are mounted, resilient picking means rotatably carried by the drums of said first and said second series for picking feathers from poultry passed between the rows of drums on said drive shafts.

7. In a poultry picking machine, a main frame, a pair of picking frames adjustably supported on said frame for vertical adjustment at each end and lateral movement of adjustment of the distance between said picking frames, a main drive shaft and an auxiliary drive shaft on each of said picking frames, said main drive shafts being normally inclined from the horizontal and juxtaposed in substantially parallel relation both horizontally and vertically with respect to each other, a first series of drums secured to each said main drive shaft for rotation therewith, a second series of drums mounted on each said main drive shaft for rotation independently thereof with drums of said second series mounted alternately with drums of said first series and with drums of the first series on one main drive shaft facing drums of the first series on the other main drive shaft and with drums of the second series on one main drive shaft facing drums of the second series on the other main drive shaft, means connected to said main drive shafts for driving the series of drums secured thereto in opposite directions, means respectively connecting the drums of each said second series with one of said auxiliary drive shafts, means operably connected with each said auxiliary drive shaft for driving the drums of each said second series of drums in a direction opposite the direction of rotation of the main drive shaft on which they are mounted, resilient picking fingers rotatably carried by the drums of said first and said second series for picking feathers from poultry passed between the rows of drums on said main drive shafts.

8. In a poultry picking machine, a main frame, a pair of picking frames adjustably supported on said frame for vertical adjustment at each end and lateral movement for adjustment of the distance between said picking frames, a main drive shaft and an auxiliary drive shaft on each of said picking frames, said main drive shafts being normally inclined from the horizontal and juxtaposed in substantially parallel relation both horizontally and vertically with respect to each other, a first series of drums secured to each said main drive shaft for rotation therewith, a second series of drums mounted on each said main drive shaft for rotation independently thereof with the drums of said second series interspersed among the drums of said first series and with drums of the first series on one main drive shaft facing drums of the first series on the other main drive shaft and with drums of the second series on one main drive shaft facing drums of the second series on the other main drive shaft, means connected to said main drive shafts for driving the series of drums secured thereto in opposite directions, means respectively connecting the drums of each said second series with one of said auxiliary drive shafts, means operably connected with each said auxiliary drive shaft or driving the drums of each said second series of drums in a direction opposite the direction of rotation of the main drive shaft on which they are mounted, resilient picking fingers rotatably carried by the drums of said first and said second series for picking feathers from poultry passed between the rows of drums on said main drive shafts.

9. In a poultry picking machine, a main frame, a pair of picking frames adjustably supported on said frame for vertical adjustment at each end and independent lateral movement for adjustment of the distance between said picking frames, a main drive shaft and an auxiliary drive shaft on each of said picking frames, said main drive shafts being normally inclined from the horizontal and juxtaposed in substantially parallel relation both horizontally and vertically with respect to each other, a first series of drums secured to each said main drive shaft for rotation therewith, a second series of drums mounted on each said main drive shaft for rotation independently thereof with the drums of said second series interspersed alternately among the drums of said first series between the end drums of each of said first series of drums and with drums of the first series on one main drive shaft facing drums of the first series on the other main drive shaft and with drums of the second series on one main drive shaft facing drums of the second series on the other main drive shaft, means connected to said main drive shafts for driving the series of drums secured thereto in opposite directions, means respectively connecting the drums of each said second series with one of said auxiliary drive shafts, means operably connected with each said auxiliary drive shaft for driving the drums of each said second series of drums in a direction opposite the direction of rotation of the main drive shaft on which they are mounted, resilient picking fingers rotatably carried by the drums of said first and said second series for picking feathers from poultry passed between the rows of drums on said main drive shafts.

10. In a poultry picking machine, a first set of rotatably mounted axially-aligned drums, drive means operably connected for rotating certain of said drums in clockwise direction and the remainder of said drums in counterclockwise direction, the arrangement being such that the drums to be rotated in counterclockwise direction are interspersed with the drums to be rotated in clockwise direction, a second set of similarly aligned and oppositely driven rotatably-mounted drums beside said first set of drums, and resilient means on the drums on both of said sets for striking and picking feathers from fowl conveyed along a predetermined path between said sets of drums.

References Cited in the file of this patent

UNITED STATES PATENTS

| | | |
|---|---|---|
| 2,469,345 | Toti et al. | May 3, 1949 |
| 2,560,524 | Johnson | July 10, 1951 |
| 2,694,220 | Sharp | Nov. 16, 1954 |
| 2,743,477 | Barker et al. | May 1, 1956 |